Patented June 21, 1932

1,863,814

UNITED STATES PATENT OFFICE

LEO ROSENTHAL, OF LEVERKUSEN-WIESDORF-ON-THE-RHINE, GERMANY, ASSIGNOR TO I. G. FARBENINDUSTRIE AKTIENGESELLSCHAFT, OF FRANKFORT-ON-THE-MAIN, GERMANY

SYNTHETIC RESINS

No Drawing. Application filed September 5, 1930, Serial No. 480,022, and in Germany November 30, 1926.

The present invention relates to a process of preparing valuable synthetic resins. In my copending application for Patent Ser. No. 235,117, filed November 22, 1927 for "synthetic resins", I have described a process of preparing synthetic resins which process consists in causing crude solvent naphtha to be acted upon by ferric chloride in the presence of phenol. As starting material there is used a crude solvent naphtha free from bases, generally having a boiling point between 160 and 180° C., but also the crude solvent naphtha of a higher boiling point, say up to 200° C., is suitable for carrying out my said process. There may also be started with a phenol-free crude solvent naphtha or a solvent naphtha poor in phenol in which cases the requisite amount of a phenol is added. Suitable phenols are for example, phenol, cresols, naphthols and their homologues.

The reaction is advantageously carried out in such a manner that the mixture of crude solvent naphtha (free from bases), and a phenol is vigorously stirred with ferric chloride (anhydrous or water containing) or a ferric chloride solution at a temperature of from 20 to 25° C. The formation of resin takes place with evolution of heat. Suitable cooling is provided, by which a rise of the temperature of reaction being not essentially higher than fo about 50° C. can be avoided.

In order to remove from the reaction liquid the iron contained therein it is diluted with suitable liquids such as aromatic liquid hydrocarbons, e. g. benzene, xylene or purified solvent naphtha, and the liquid is separated from the precipitate and further treated with CaO and an activated or non-activated fuller's earth.

According to the statement in the said copending application the requisite amount of phenol is dependent on the amount of resinifiable substances present in the crude solvent naphtha (coumarone and indene) and care is taken that generally about at least 10% of a phenol calculated on the amount of the resinifiable substance are present.

Now by further investigations I have found that the process described in the parent application can favorably be carried out by providing a phenol content of about at least 10% calculated on the amount of the indene present in the crude solvent naphtha. I prefer to carry out my process by using a phenol content of between about 10% calculated on the amount of indene and about 10% calculated on the amount of the resinifiable substance present in the solvent naphtha. In this connection it may be mentioned that the content of resinifiable substance present in the crude solvent naphtha suitable for the purpose of my invention varies in the widest limits, say between about 20 and 80%, and also the ratio of coumarone to indene in the resinifiable substance varies in wide limits, for example the ratio may be 1:2, or 1:3, or 2:1, or 3:1.

It is to be understood that both methods of carrying out my process, adding the requisite quantity of a phenol to a phenol-free crude solvent naphtha and starting with a crude solvent naphtha containing phenol, fall within the scope of my invention.

The products thus obtained are slightly colored resins which are soluble in linseed oil, wood oil and in heat-bodied oils. Their melting point depends on the relative proportions of phenol and indene present in the resinifiable substance used for their manufacture.

My resins when prepared from a mixture of a phenol-free crude solvent naphtha and a suitable homologue of phenol yield oil varnishes which do not change at high temperatures.

The following example will illustrate the principles underlying my invention, which obviously are applicable with very wide variation:

*Example.*—The starting material consists of a crude solvent naphtha, practically free from bases and phenols, boiling within the limits 160–186° C. and having a content of 62% of resinifiable constituents which are formed by 46.8% of indene and 15.2% of coumarone. In 200 parts by weight of this crude solvent naphtha 9 parts by weight of phenol (=about 10% of the quantity of indene present in the starting material) are dissolved. Into this solution 14 parts by weight of molten crystallized ferric chloride ($FeCl_3.6H_2O$) are gradually introduced with vigorous stirring at an initial temperature of 20° C. The reaction soon commences accompanied by a rise of temperature to 52–55° C. Stirring is continued for a further period of 6–8 hours, care being taken that the temperature of reaction does not exceed 60° C. When the reaction is complete, the mass is diluted with 100 parts by weight of xylene. The solution is freed from the bulk of ferric chloride by filtration and then stirred up for some time with about 10 parts by weight of quick lime with the addition of activated or non-activated fuller's earth at first in the cold and then while heating to about 90–100° C. The solvent is removed from the filtered resin solution by distillation in vacuo. A light resin is obtaned, which begins to sinter at about 125° C. and melts at 158° C. It is completely soluble in linseed oil, wood oil and in viscous heat-bodied oils.

This is a continuation in part of our application Ser. No. 235,117, filed Nov. 22, 1927.

I claim:

1. In the process for the manufacture of synthetic resins the step which comprises heating crude solvent naphtha boiling at a temperature of between about 160 and about 180° C. in which a phenol is present in an amount of between about 10%, calculated on the amount of indene, and about 10%, calculated on the amount of the resinifiable substance present in the solvent naphtha, with ferric chloride at a temperature of between about 20 and about 60° C.

2. In the process for the manufacture of synthetic resins the step which comprises heating crude solvent naphtha free from bases boiling at a temperature of between about 160 and about 180° C. in which a phenol is present in an amount of between about 10%, calculated on the amount of indene, and about 10%, calculated on the amount of the resinifiable substance present in the solvent naphtha, with ferric chloride at a temperature of between about 20 and about 60° C.

3. The process for the manufacture of synthetic resins which comprises heating crude solvent naphtha boiling at a temperature of between about 160 and about 180° C. in which a phenol is present in an amount of between about 10%, calculated on the amount of indene, and about 10%, calculated on the amount of the resinifiable substance present in the solvent naphtha, with ferric chloride at a temperature of between about 20 and about 60° C., diluting the reaction mixture with a solvent for the resin of the aromatic liquid hydrocarbon series, separating the liquid from the precipitate formed, and stirring the liquid with calcium oxide and with fuller's earth, thereby heating the same, filtering and distilling off the solvent.

4. The process for the manufacture of synthetic resins which comprises heating crude solvent naphtha free from bases boiling at a temperature of between about 160 and about 180° C. in which a phenol is present in an amount of between about 10%, calculated on the amount of indene, and about 10%, calculated on the amount of the resinifiable substance present in the solvent naphtha, with ferric chloride at a temperature of between about 20 and about 60° C., diluting the reaction mixture with a solvent for the resin of the aromatic liquid hydrocarbon series, separating the liquid from the precipitate formed, and stirring the liquid with calcium oxide and with fuller's earth, thereby heating the same, filtering and distilling off the solvent.

5. A process for the manufacture of synthetic resins which comprises dissolving in 200 parts by weight of a crude solvent naphtha free from bases and phenols boiling at a temperature of between about 160 and about 180° C. and having a content of 62% of resinifiable constituents which are formed by 46.8% of indene and 15.2% of coumarone, 9 parts by weight of phenol gradually adding 14 parts by weight of molten crystallized ferric chloride and stirring the mixture for a few hours at a temperature not higher than 60° C., diluting the reaction mixture with 100 parts by weight of xylene, filtering, stirring the filtrate with 10 parts by weight of quick lime with the addition of fuller's earth while heating to about 90–100° C., filtering and distilling off the solvent from the filtrate.

In testimony whereof I affix my signature.

LEO ROSENTHAL.